(12) United States Patent
Uhl

(10) Patent No.: US 10,030,692 B2
(45) Date of Patent: Jul. 24, 2018

(54) SECURING CLIP COMPRISING A LOCKING MECHANISM

(75) Inventor: Albert Uhl, Buehl (DE)

(73) Assignee: GMT Gummi-Metall-Technik GmbH, Buehl (DE)

( * ) Notice: Subject to any disclaimer, the term of this patent is extended or adjusted under 35 U.S.C. 154(b) by 47 days.

(21) Appl. No.: 13/980,409

(22) PCT Filed: Nov. 15, 2011

(86) PCT No.: PCT/EP2011/005749
§ 371 (c)(1),
(2), (4) Date: Aug. 15, 2013

(87) PCT Pub. No.: WO2012/100794
PCT Pub. Date: Aug. 2, 2012

(65) Prior Publication Data
US 2013/0319172 A1 Dec. 5, 2013

(30) Foreign Application Priority Data

Jan. 28, 2011 (DE) ................... 20 2011 002 079 U

(51) Int. Cl.
*F16C 9/00* (2006.01)
*F16C 7/06* (2006.01)
*F16B 7/18* (2006.01)

(52) U.S. Cl.
CPC ................. *F16C 9/00* (2013.01); *F16C 7/06* (2013.01); *F16B 7/182* (2013.01); *Y10T 74/2142* (2015.01)

(58) Field of Classification Search
CPC ............. Y10T 74/2142; Y10T 74/2143; Y10T 74/2144; Y10T 74/2148; Y10T 24/1478; Y10T 24/1471; Y10T 24/1463; Y10T 24/1465; Y10T 24/1467; Y10T 24/1469; Y10T 24/1457
USPC ...... 74/592, 593, 579 R, 580–582, 584, 586, 74/587; 285/420, 421, 413, 415; 403/43–46, 359.5
See application file for complete search history.

(56) References Cited

U.S. PATENT DOCUMENTS

| 781,067 | A | * | 1/1905 | Hewitt | ................... F16G 11/12 403/44 |
| 2,846,244 | A | * | 8/1958 | Parker | ................... F16L 23/06 24/271 |

(Continued)

FOREIGN PATENT DOCUMENTS

DE 202004016321111 U1 3/2005

*Primary Examiner* — Richard W Ridley
*Assistant Examiner* — Brian J McGovern
(74) *Attorney, Agent, or Firm* — Sheppard Mullin Richter & Hampton LLP

(57) ABSTRACT

Draw-pull bar used for guidance and mechanical mount with a locking mechanism consisting of two locking elements, namely a securing clip with a locking nose shaped as partial ring that is arranged on the toothed ring of the tubular body of the draw-pull bar by means of swivel arm and in which the locking nose engages when the securing clip swivels to the toothed ring. A bar with a hinge is fitted to one side of the resilient partial ring. When using a locking element, the bar snaps into the other end of the partial ring in such a way that the partial ring is clamped tight and an unintentional turning or undoing of the two locking elements is prevented without previous opening of the bar.

5 Claims, 4 Drawing Sheets

(56) References Cited

U.S. PATENT DOCUMENTS

| | | | | |
|---|---|---|---|---|
| 3,155,982 | A * | 11/1964 | Baratelli | A61F 9/027 2/12 |
| 6,499,709 | B1 * | 12/2002 | Parent | E06B 9/42 16/319 |
| 8,371,767 | B2 * | 2/2013 | Uhl et al. | 403/46 |
| 2004/0208727 | A1 * | 10/2004 | Magagna | E03C 1/0401 411/437 |
| 2007/0211210 | A1 * | 9/2007 | Proksch | G02C 1/08 351/121 |
| 2008/0115622 | A1 | 5/2008 | Uhl | |
| 2010/0320758 | A1 * | 12/2010 | Sisk | 285/420 |
| 2013/0229613 | A1 * | 9/2013 | Carpenter | G02C 5/008 351/113 |

* cited by examiner

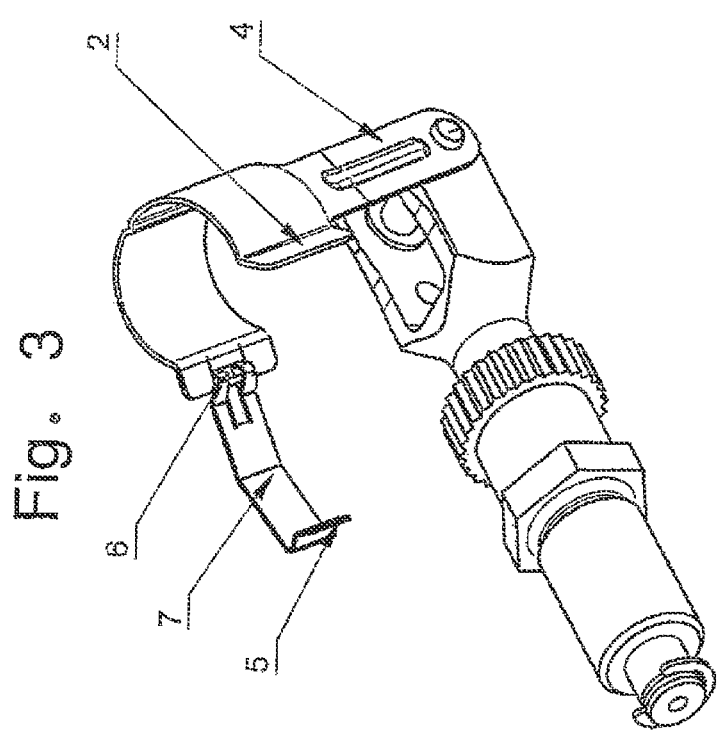

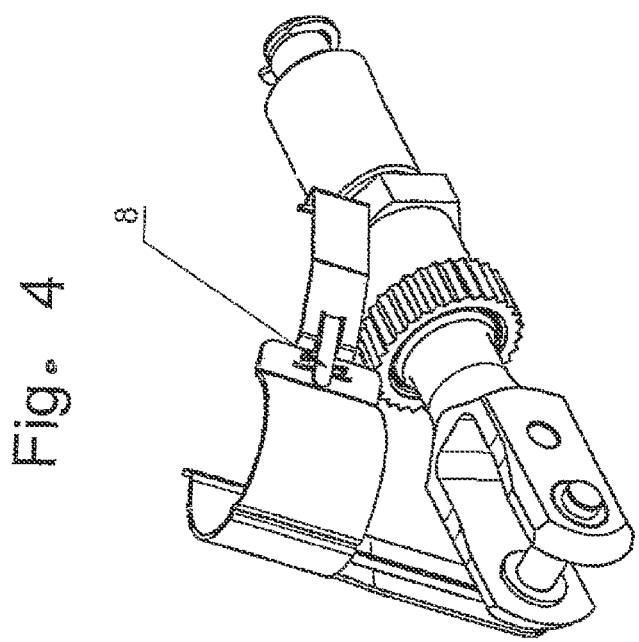

US 10,030,692 B2

SECURING CLIP COMPRISING A LOCKING MECHANISM

CROSS-REFERENCE TO RELATED APPLICATIONS

The present application is a National Stage Entry of Int'l Pat. App. No. PCT/EP2011/005749, entitled, "Securing Clip Comprising a Locking Mechanism," filed Nov. 15, 2011, which claims priority to German Pat. App. No. 20 2011 002 079.7, entitled, "Securing Clip Comprising a Locking Mechanism," filed Jan. 28, 2011.

BACKGROUND

(1) Field

The invention concerns a draw-pull bar, in particular suitable for guidance and mechanical support preferably in aircraft construction, but also in other machine and vehicle construction.

Draw-pull bars of this kind consist in general of a tubular body at each end of which an adapter is mounted for the installation of the draw-pull bar. Draw-pull bars of this kind are as a rule adjustable in their length in order that they can compensate for tolerances or can adapt to a prescribed distance between the installation points. As an example, reference is made to the draw-pull bar known from the German utility model DE 20 2004 016 321 U1, which resulted in EP 1805427 B1.

SUMMARY

A draw-pull bar is characterised in that it has two locking elements, wherein the first locking element is attached to the adapter by means of a swivel arm as a securing clip and the second locking element is attached to the tubular body. The first locking element comprises a partial ring with a locking nose which surrounds springily to three-quarters the toothed ring-shaped second locking element of the tube thus exerting sufficient force on the latter that the tubular body and the adapter are detachably locked together in the direction of rotation. This construction has proven its worth in aircraft construction primarily.

BRIEF DESCRIPTION OF THE DRAWINGS

FIG. (1) shows a cross-section of a toothed ring with the three-quarters enclosing partial ring with bent up ends, a bar with a resilient locking element and a hinge with a tongue.

FIG. (2) shows one end of the draw-pull bar with the securing clip closed, the bar, the engaged locking element with the hinge and the tongue.

Figure 1:
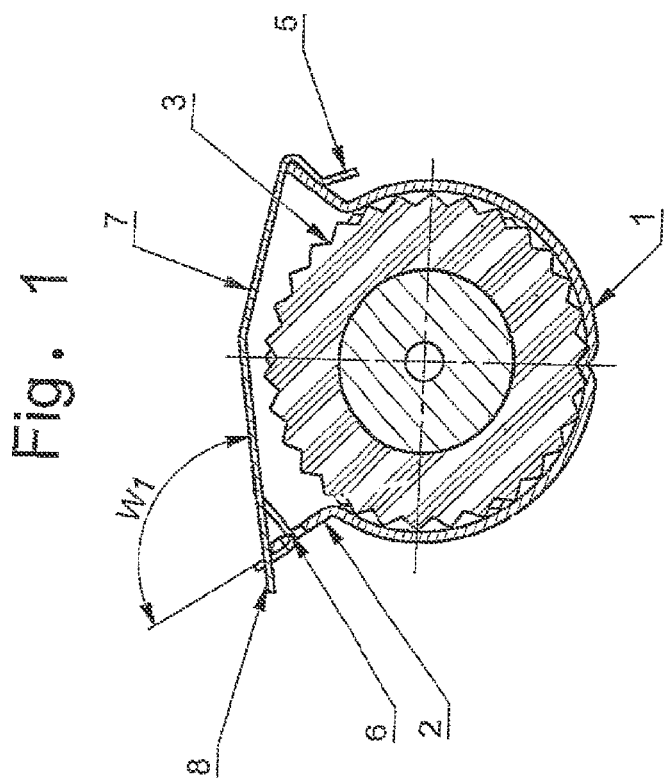
Figure 2:
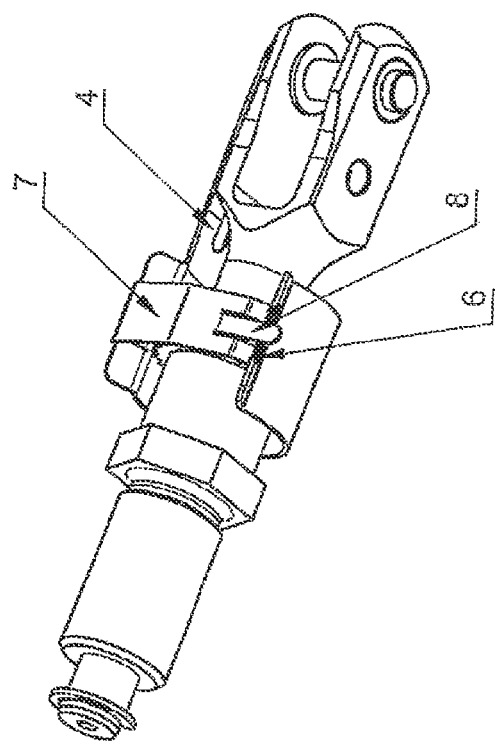

FIG. (3) shows the securing clip flipped open with the open bar, the open locking element as well as the hinge.

FIG. (4) shows another view of the securing clip flipped open with the open bar, the open locking element as well as the hinge.

DETAILED DESCRIPTION

However, as it is necessary to achieve easy, almost continuously variable installation and correct adjustment of the necessary distance between the two installation points on the one hand the locking must not be too tight. On the other hand an unintentional shift of the mounting length has to be avoided by all means after the final installation. Therefore it is the task of this invention to find a method to achieve a smooth adjustment without the use of any tools on the one hand, but to safely avoid the unintentional shift of the mounting length by carelessness or faulty operation on the other hand.

This object is achieved by the invention as follows:

According to DE 20 2004 016 321 U1 and EP 1805427 on which the invention is based the partial ring with locking nose acts in the securing clip of the draw-pull bar as a springy clamp and surrounds the toothed ring to three-quarters, whereby a twisting of the tubular body in a closed state of the securing clip is only possible when the locking nose of the partial ring can spring back from the toothed ring. For this reason, an undesired spring back of the clamp and/or of the partial ring has to be avoided. The partial ring which surrounds in a sprung manner the toothed ring to three-quarters is therefore provided with a bending up on each end which are suitable for fastening and snapping in of a bar. Surprisingly it was found that an unintentional unlocking of the locking elements can be prevented, if and when required so, by an actually adverse but easy releasable locking of the partial ring at the bend-up ends which surrounds the toothed ring with the three-quarter partial ring without any impact on the advantageous property of sufficient smooth adjustment, as this bar is shaped in such a way that it does not engage in the actual locking and unlocking mechanism of the locking elements.

According to the invention the solution is found by the fact that a bar made of resilient stainless steel preferably is attached to the partial ring, whereby the problem was that this bar has to be firmly attached to the partial ring at least at one side on the one hand, but that it can be opened sufficiently wide at any time during the installation of the draw-pull bar regardless whether the securing clip is open or closed. The solution of the task was achieved by the fact that the bar is hinge-like and moveably attached to one of the bent up ends of the partial ring with two locking noses and that the otherwise plane bar positively snaps in to the other bent up end of the partial ring by means of a springy bracket shaped complementarily to the bent up end of the partial ring, thus ensuring a secure locking of the partial ring in order to prevent unintentional rotation.

In addition, the bar has been provided on the side of the hinge with a resilient tongue meshing with the bent up end of the partial ring which holds the bar in the requested open position after opening, so that the bar does not obstruct the closing process during closing the securing clip.

Hereinafter the invention is clarified by means of a preferred embodiment.

FIG. (1) shows a cross-section of the toothed ring 3 with the three-quarters enclosing partial ring 1 with the bent up ends 2, the bar 7 with the resilient locking element 5 and the hinge 6 with tongue 8.

FIG. (2) shows one end of the draw-pull bar with the securing clip 4 closed, the bar 7, the engaged locking element 5 with the hinge 6 and the tongue 8.

FIG. (3) shows the securing clip 4 flipped open with the open bar 7, the open locking element 5 as well as the hinge 6.

The invention claimed is:
1. A system comprising:
a draw-pull bar with a securing clip presenting a partial ring which surrounds three quarters of a toothed ring of the draw-pull bar and disposing of two bent up ends comprising a first bent up end and a second bent up end, wherein a locking mechanism is fitted to each of the two bent up ends, the locking mechanism comprising a bar, made of resilient stainless steel, the bar being moveably attached to the partial ring by a hinge on one side and the bar having an angularly shaped resilient locking element as a complementary element to the first bent up end of the partial ring on another side, the angularly shaped resilient locking element being configured to enclose the first bent up end of the bent up ends of the partial ring in an interlocking manner, wherein the hinge comprises two separate locking elements which are pushed into a recess of the second bent up end of the partial ring, thus connecting the hinge firmly but moveably to the partial ring, wherein a tongue is attached to the bar on a side of the hinge in such a way that the tongue engages on the second bent up end, a respective slit slit between the tongue and each of the two locking elements extends along an entirety of a longest extent of the tongue.

2. A system according to claim 1 wherein the hinge is shaped relative to the first bent up end in such a way that the bar can be opened with an opening angle to permit the toothed ring to be received in and removed from the partial ring.

3. A system according to claim 2 wherein the opening angle of the bar is more than 90 degrees.

4. A system according to claim 1, wherein the angularly shaped resilient locking element of the bar has an accurately fitting in-bent angle that is complementary to the first bent up end of the partial ring, snapping onto the partial ring in an interlocking manner.

5. A system according to claim 1, wherein the tongue holds the bar in an open position after opening.

* * * * *

UNITED STATES PATENT AND TRADEMARK OFFICE
CERTIFICATE OF CORRECTION

PATENT NO. : 10,030,692 B2
APPLICATION NO. : 13/980409
DATED : July 24, 2018
INVENTOR(S) : Albert Uhl It is certified that error appears in the above-identified patent and that said Letters Patent is hereby corrected as shown below:

In the Claims

In Column 3, Line 15: "second bent up end, a respective slit slit between the" should be -- second bent up end, a respective slit between the --

Signed and Sealed this
Twenty-third Day of October, 2018

Andrei Iancu
*Director of the United States Patent and Trademark Office*